(12) United States Patent
Kumar (10) Patent No.: US 7,486,658 B2
(45) Date of Patent: Feb. 3, 2009

(54) METHOD AND SYSTEM FOR MEDIA SYNCHRONIZATION IN QOS-ENABLED WIRELESS NETWORKS

(75) Inventor: Rajneesh Kumar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 525 days.

(21) Appl. No.: 11/192,706

(22) Filed: Jul. 29, 2005

(65) Prior Publication Data

US 2007/0025325 A1 Feb. 1, 2007

(51) Int. Cl.
*H04J 3/06* (2006.01)
(52) U.S. Cl. .................... 370/350; 370/252; 455/198.1; 455/452.2
(58) Field of Classification Search ................. 370/338, 370/349, 350, 331, 252, 474, 465; 455/452.2, 455/198.1, 135
See application file for complete search history.

(56) References Cited

U.S. PATENT DOCUMENTS

| | | | |
|---|---|---|---|
| 7,042,855 B1 * | 5/2006 | Gilchrist et al. | 370/328 |
| 7,099,283 B2 * | 8/2006 | Matta et al. | 370/252 |
| 7,319,691 B2 * | 1/2008 | Qing et al. | 370/351 |
| 2003/0133408 A1 * | 7/2003 | Cheng et al. | 370/230 |
| 2004/0177107 A1 * | 9/2004 | Qing et al. | 709/200 |
| 2004/0203820 A1 * | 10/2004 | Billhartz | 455/452.1 |
| 2005/0009533 A1 * | 1/2005 | Benveniste et al. | 455/452.2 |
| 2005/0100021 A1 * | 5/2005 | Suomi | 370/395.21 |
| 2005/0135422 A1 * | 6/2005 | Yeh | 370/474 |
| 2005/0147097 A1 * | 7/2005 | Chari et al. | 370/392 |
| 2005/0176473 A1 * | 8/2005 | Melpignano | 455/574 |
| 2005/0195858 A1 * | 9/2005 | Nishibayashi et al. | 370/474 |
| 2005/0197148 A1 * | 9/2005 | Ali et al. | 455/522 |
| 2006/0133272 A1 * | 6/2006 | Yuan et al. | 370/230 |
| 2006/0146868 A1 * | 7/2006 | Ginzburg | 370/465 |

OTHER PUBLICATIONS

Maria Jose Perez-Luque and Thomas D.C. Little, *A Temporal Reference Framework for Multimedia Synchronization*, IEEE Journal on Selected Areas in Communications, vol. 14, No. 1, Jan. 1996, pp. 36-51.

Yutaka Ishibashi and Shuji Tasaka, *A Synchronization Mechanism for Continuous Meida in Multimedia Communications*, Department of Electrical and Computer Engineering, Nagoya Institute of Technologym Nagoya 466, Japan. Copyright 1995 IEEE.

Chandong Liu, Yong Xie, Myung J. Lee and Tarek N. Saadawi, *Multipoint Multimedia Teleconference System with Adaptive Synchronization*, IEEE Journal on Selected Areas in Communications, vol. 14, No. 7, Sep. 1996, pp. 1422-1435.

(Continued)

*Primary Examiner*—CongVan Tran
(74) *Attorney, Agent, or Firm*—Baker Botts L.L.P.

(57) ABSTRACT

A method and system directed to negotiating and triggering media stream synchronization at the link layer in a QoS-enabled 802.11 WLAN, or other wireless, network. In one implementation, the present invention allows for improved performance of streaming network applications, such as video conferencing, over wireless links. In one implementation, the present invention also provides an optional mechanism whereby a mobile station can signal a need for on-the-fly throttling, if an application on the mobile detects that there is a need for better synchronization of two streams, such as a lower priority stream to a higher priority stream.

43 Claims, 4 Drawing Sheets

OTHER PUBLICATIONS

Gerold Blakowski and Ralf Steinmetz, *A Media Synchronization Survey: Reference Model, Specification and Case Studies*, IEEE *Journal on Selected Areas in Communications*, vol. 14, No. 1, Jan. 1996, pp. 5-35.

Colm Elliott, *Stream Synchronization for Voice over IP Conference Bridges*, Department of Electrical and Computer Engineering, McGill University, Montreal, Canada. Copyright 2004 Colm Elliot.

* cited by examiner

METHOD AND SYSTEM FOR MEDIA SYNCHRONIZATION IN QOS-ENABLED WIRELESS NETWORKS

FIELD OF THE INVENTION

The present invention relates to Quality-of-Service (QoS) in wireless computer networks and, more particularly, to the synchronization of data streams, which may be in the same or different access classes, over a QoS-enabled wireless network.

BACKGROUND OF THE INVENTION

Market adoption of wireless LAN (WLAN) technology has exploded, as users from a wide range of backgrounds and vertical industries have brought this technology into their homes, offices, and increasingly into the public air space. This inflection point has highlighted not only the limitations of earlier-generation systems, but the changing role WLAN technology now plays in people's work and lifestyles, across the globe. Indeed, WLANs are rapidly changing from convenience networks to business-critical networks. Increasingly users are depending on WLANs to improve the timeliness and productivity of their communications and applications, and in doing so, require greater visibility, security, management, and performance from their network.

As enterprises and other entities increasingly rely on wireless networks, the capabilities of wireless clients and the uses to which they are put increasingly expand. For example, certain wireless clients, such as laptops and even cell phones with WLAN capabilities, use wireless connections to access the wired computer network and make telephone calls, or engage in other interactive sessions involving multimedia elements, such as voice, video, graphics, and the like. Voice-over-IP (VoIP), for example, describes facilities for managing the delivery of voice information using the Internet Protocol (IP). In general, this means sending voice information in digital form in discrete packets rather than in the traditional circuit-switched protocols of the public switched telephone network. In addition to IP, VoIP uses the real-time protocol (RTP) to help ensure that packets get delivered in a timely way, and uses the Session Initiation Protocol (SIP) to set up the session implementing the call.

Many real-time network applications, such as video conferencing, involve multiple data streams, each corresponding to a different network data or traffic type, such as voice/audio data, video data and the like. Simulation results with IEEE 802.11e networks have shown that when a mixture of voice and data traffic is simulated, the voice traffic, because of its highest priority pushes data back and as a result the AP is able to achieve higher number of voice calls. However, this comes at the cost of decreased throughput and increased delay and jitter of the data traffic. Accordingly, video traffic can suffer the same fate while competing with voice traffic. While it is possible to adjust the Enhanced Distributed Channel Access (EDCA) parameters of the VI and VO class to strike a balance between voice capacity and how much the video suffers, it is believed that it could lead to statistical underutilization of resources if the new parameters do not capture the needs of various applications. Video conferencing is one such application where correlation of audio and video stream is important for purposes of lip-synchronization.

In light of the foregoing, a need in the art exists for methods, apparatuses and systems directed to the synchronization of traffic streams over IEEE 802.11 or other wireless local area networks or links. Embodiments of the present invention substantially fulfill this need.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DETAILED DESCRIPTION OF THE INVENTION

The present invention provides, in one implementation, a method and system directed to negotiating and triggering media stream synchronization at the link layer in a QoS-enabled 802.11 WLAN, or other wireless network. In one implementation, the present invention allows for improved performance of streaming network applications, such as video conferencing, over wireless links. In one implementation, the present invention also provides an optional mechanism whereby a mobile station can signal a need for on-the-fly throttling, if an application on the mobile station detects that there is a need for better synchronization of two streams, such as a lower priority stream to a higher priority stream. In one implementation, the present invention can be practiced by extending the IEEE 802.11e WLAN specification. Of course, the present invention can be applied within the context of other wireless network protocols. A system comprising means for performing the above functions is also set forth according to the present invention.

Figure 1:
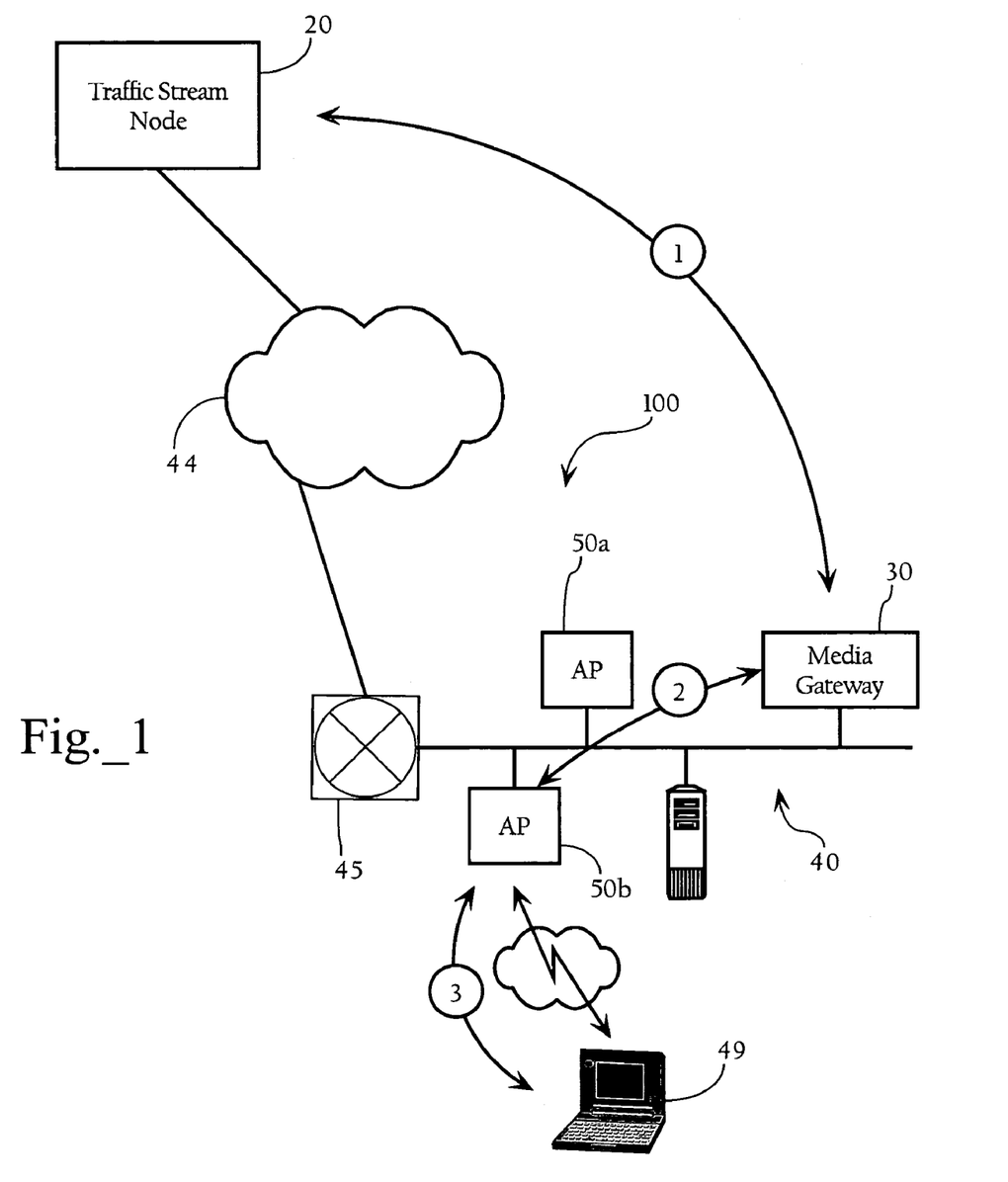
FIG. 1 is a simplified block diagram of the components and communication flow in a wireless local area network system in accordance with principles of the present invention.

FIG. 1 illustrates a network environment in which embodiments of the present invention may operate. In a specific embodiment of the present invention, the system 100 includes one or more wireless access points 50a, 50b (collectively referred to as 50), a media gateway 30, a traffic streaming node 20, and mobile station 49. FIG. 1 illustrates one possible network environment in which the invention may operate. As FIG. 1 illustrates, for example, network 40 may be a LAN or LAN segment implemented by an Ethernet switch (or an array of switches) having multiple ports to which the wireless access points 50, media gateway 30, and other nodes are connected. Still further, router 45 and network 44, which may be a LAN, LAN segment, or a Wide Area Network (WAN), allow for the transmission of traffic streams between traffic streaming node 20 and media gateway 30.

Figure 3:
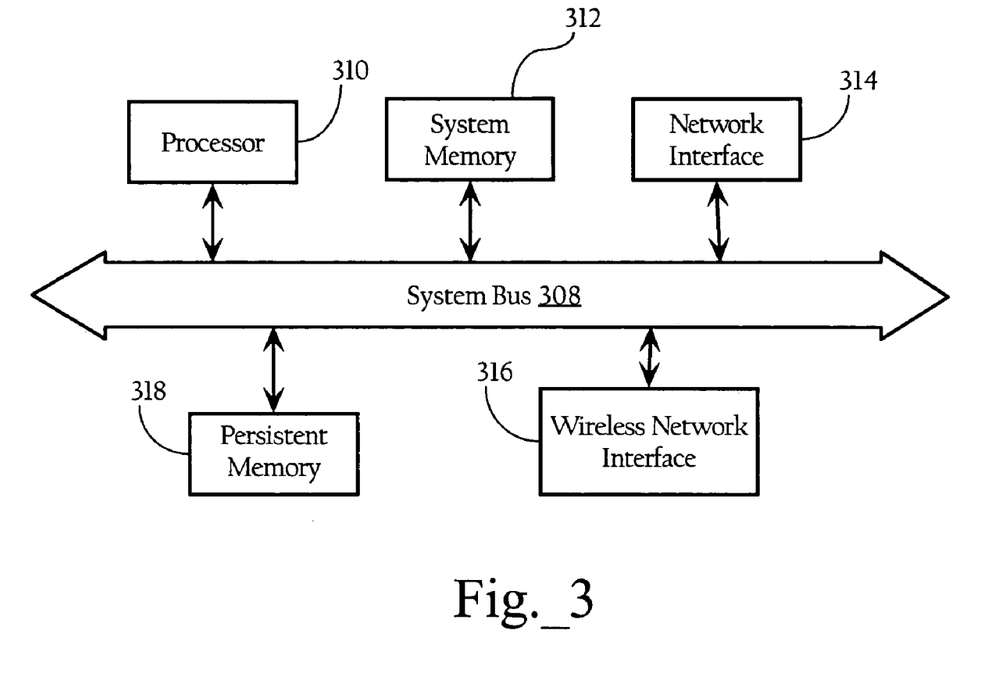
FIG. 3 is a functional block diagram illustrating the components of an access point according to one embodiment of the invention.

The wireless access points 50 are enabled to wirelessly communicate with remote client devices or mobile stations (not shown). In one implementation, the wireless access points 50 implement the wireless network protocol specified in the IEEE 802.11 specification. The wireless access points 50 may be autonomous or so-called "fat" access points, or light-weight access points operating in connection with a wireless switch (not illustrated), as disclosed in U.S. patent application Ser. No. 10/407,584, now U.S. Pat. No. 7,212, 837. The wireless access points 50 are typically connected to the network 40 via Ethernet links; however, other link layer connection protocols or communication means can be employed. As FIG. 3 illustrates, in one implementation, a wireless access point 50 comprises a processor 310, a memory 312, a network interface (e.g., an Ethernet network interface) for communication with network 40, a wireless network interface 316 (e.g., an IEEE 802.11 WLAN interface) for communication with one or more mobile stations, a system bus 308 interconnecting these components, as well as software modules (including DHCP clients, CDP modules, access point modules, SNMP functionality, etc.) and device drivers (e.g., network and WLAN interface drivers) stored in persistent memory 318 (e.g., a hard disk drive, flash memory, etc.). At start up, these software components are loaded into memory 312 and then accessed and executed by processor 310. In one implementation, the access points 50 further include link-layer QoS mechanisms, such as the QoS mechanism disclosed in the IEEE 802.11e standard, as well as the link-layer, inter-stream synchronization functionality described herein.

Traffic stream node 20 can take a wide variety of forms. For example, traffic stream node 20 may be a multimedia server operative to transmit multimedia traffic to mobile station 49. In another implementation, traffic stream node 20 can be a VoIP/video conferencing system. In another implementation, traffic stream node 20 can be a voice/video telephone or a voice/video terminal that makes voice/video call directly to another such terminal. For didactic purposes, an embodiment of the present invention is described as operating in connection with the Session Initiation Protocol (SIP) and the Real-Time Transport Protocol (RTP). SIP [IETF Request for Comments [RFC] 2543] is an Internet Engineering Task Force (IETF) standard protocol for initiating or signaling an interactive user session that involves multimedia elements such as video, voice, chat, gaming, and multimedia. Like HTTP or SMTP, SIP works in the Application layer of the Open Systems Interconnection (OSI) communications model. SIP can establish multimedia sessions or Internet telephony calls, and modify, or terminate them. RTP is a protocol designed to provide end-to-end network transport functions for applications transmitting real-time data, such as audio, video, or simulation data, over multicast or unicast network services. RTP provides services such as payload type identification, sequence numbering, time-stamping, and delivery monitoring to real-time applications. The present invention, however, can be implemented using other protocols, such as H.323 signaling protocols, and other real-time network transport or streaming protocols. Still further, the implementation of the invention herein is described as involving extensions to the IEEE 802.11e specification. The present invention, however, can operate in connection with any suitable wireless link layer QoS mechanism.

Mobile station 49 may take a variety of forms, such as a wireless videoconferencing station, a personal digital assistant, a laptop, and the like. In one implementation, a mobile station generally includes a processor, a memory, a wireless network interface, and a wireless network interface driver that includes logic directed to the inter-stream synchronization functions described herein. In one implementation, the mobile station may include a streaming client application enabled to monitor the receipt of packets corresponding to two streams and signal the inter-stream synchronization functions to perform a requested action. In one implementation, the present invention can be embodied in a driver code object stored on a computer-readable medium, or embodied in a carrier wave expressing data signals transmitted to a remote device, that when installed on a client device implements the inter-stream synchronization functions described herein.

Figure 4:
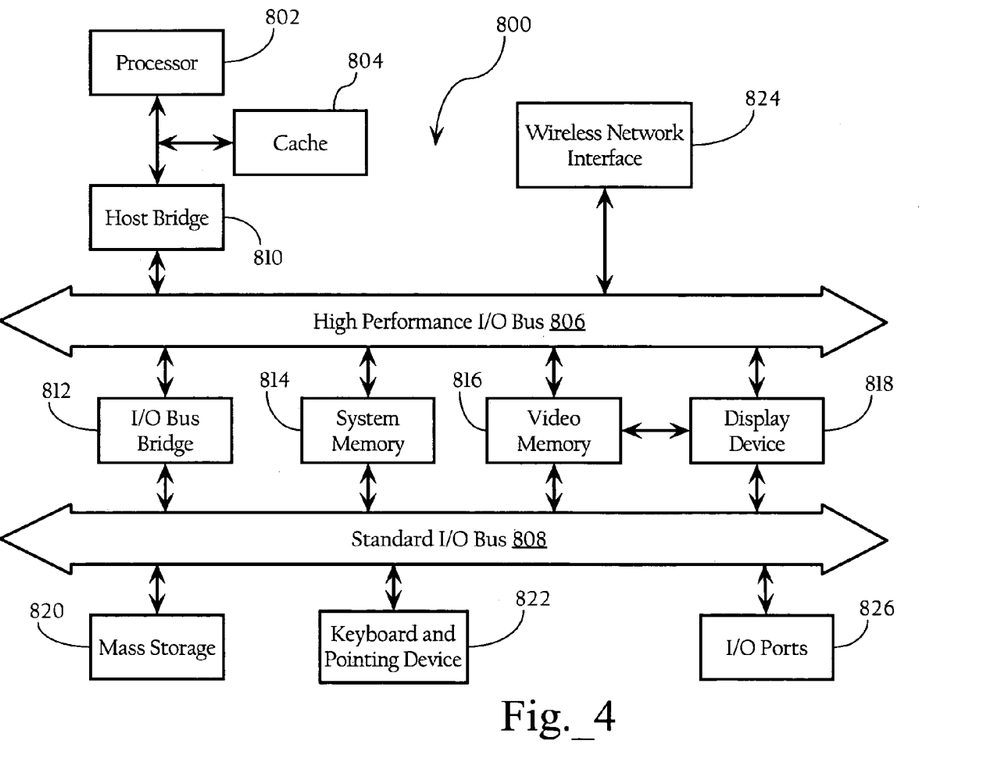
FIG. 4 is a functional block diagram illustrating the components of a wireless client according to one embodiment of the invention.

FIG. 4 illustrates, for didactic purposes, the hardware architecture of a mobile station 49 according to one implementation of the present invention. The present invention, however, can be implemented on a wide variety of computer system architectures, such as Personal Digital Assistants, Laptop computers, and the like. An operating system manages and controls the operation of system 800, including the input and output of data to and from software applications (not-shown). The operating system provides an interface, such as a graphical user interface (GUI), between the user and the software applications being executed on the system. According to one embodiment of the present invention, the operating system is the Windows® 95/98/NT/XP operating system, available from Microsoft Corporation of Redmond, Wash. However, the present invention may be used with other conventional operating systems, such as the Apple Macintosh Operating System, available from Apple Computer Inc. of Cupertino, Calif., UNIX operating systems, LINUX operating systems, and the like.

FIG. 4 illustrates one embodiment of a computer hardware system. suitable for use with the present invention. In the illustrated embodiment, hardware system 800 includes processor 802 and cache memory 804 coupled to each other as shown. Additionally, hardware system 800 includes high performance input/output (I/O) bus 806 and standard I/O bus 808. Host bridge 810 couples processor 802 to high performance I/O bus 806, whereas I/O bus bridge 812 couples the two buses 806 and 808 to each other. Coupled to bus 806 are wireless network interface 824, system memory 814, and video memory 816. In turn, display device 818 is coupled to video memory 816. Coupled to bus 808 are mass storage 820, keyboard and pointing device 822, and I/O ports 826. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 800 perform their conventional functions known in the art. In particular, wireless network interface 824 is used to provide communication between system 800 and any of a wide range of wireless networks, such as a WLAN (e.g., IEEE 802.11) network, etc. Mass storage 820 is used to provide permanent storage for the data and programming instructions to perform the above described functions implemented in the system controller, whereas system memory 814 (e.g., DRAM) is used to provide temporary storage for the data and programming instructions when executed by processor 802. I/O ports 826 are one or more serial and/or parallel communication ports used to provide communication between additional peripheral devices which may be coupled to hardware system 800.

Hardware system 800 may include a variety of system architectures and various components of hardware system 800 may be rearranged. For example, cache 804 may be on-chip with processor 802. Alternatively, cache 804 and processor 802 may be packed together as a "processor module", with processor 802 being-referred to as the "processor core". Furthermore, certain implementations of the present invention may not require nor include all of the above components. For example, the peripheral devices shown coupled to standard I/O bus 808 may be coupled to high performance I/O bus 806; in addition, in some implementations only a single bus may exist with the components of hardware system 800 being coupled to the single bus. Furthermore, additional components may be included in system 800, such as additional processors, storage devices, or memories.

As discussed above, in one embodiment, the operations of the client-side stream synchronization functionality described herein are implemented as a series of software routines run by hardware system 800 of FIG. 4. These software routines, which can be embodied in a wireless network interface driver, comprise a plurality or series of instructions to be executed by a processor in a hardware system, such as processor 802. Initially, the series of instructions are stored on a storage device, such as mass storage 820. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 824. The instructions are copied from the storage device, such as mass storage 820, into memory 814 and then accessed and executed by processor 802.

FIG. 1 also illustrates the network traffic flow between mobile station 49 and traffic streaming node 20. Media gateway 30, in one implementation, handles media stream processing tasks, such as synchronization of traffic streams, between it and the traffic stream node 20 (Ref No. 1), and forwards the streams via access point 50b (Ref. No. 2) to mobile station 49 (Ref. No. 3). In one implementation, media gateway 30 also provides SIP proxy functionality for forwarding SIP messages, and for allowing a SIP client on mobile station 49 to register address bindings that can be used to reach the mobile station 49. One of ordinary skill in the art will recognize that the use of media gateway 30 is primarily for RTP processing (e.g., mixing, synchronization, etc.). In other implementations, RTP traffic may flow from the network to access point 50b and then to mobile station 49, if mobile station 49 includes suitable RTP processing functionality without support from media gateway 30. In such an implementation, the SIP server functionality of media gateway may still be used for call or session set-up.

As discussed above, many multimedia applications involve concurrent traffic streams of the same or different data types (e.g., voice, video, etc.). At the receiving end, these traffic streams often require synchronization in order to achieve an acceptable user experience. For example, an audio and a video stream in a video conference system may traverse through different network components and thus the packets in the streams start becoming separated in time. These packets also go through various media-specific operations like video/audio mixing, transcoding, video-transrating, etc.—adding unequal processing delays. At the end-point, or an intermediate point, where the streams meet once again, a lip-sync algorithm tries to sync them back again. However, there is a limit to which this syncing can be performed, and if, this limit is exceeded, many packets must be dropped. For example, a synchronized playout of a mediaA stream and mediaB stream requires that the mediaA and mediaB packets generated at almost the same time (by the stream source(s)) are played in temporal vicinity of each other. For example, the following two constraints, if observed, ensure that the media-bearing packets in the two streams remain relevant to the mobile station that hosts a video conferencing client: [1] A mediaA packet should be received no later than x milliseconds of receiving corresponding mediaB packet(s); and [2] A mediaB packet should be received no later than y milliseconds of receiving the corresponding mediaA packet(s). For purposes of facilitating this disclosure, the foregoing constraints are referred-to herein as XY constraints.

In one implementation, the inter-stream synchronization functionality described herein implemented by mobile station 49 can be embodied in a WLAN network interface driver and/or WLAN chip set firmware accessible to network applications that receive and/or transmit the synchronized traffic streams through application programming interfaces (APIs). In one implementation, the synchronization functionality residing on mobile station 49 is initiated based on calls made to it by a multimedia stream application, such as a VoIP-video conferencing application or a multimedia player. In one implementation, the multimedia stream application makes calls to the stream synchronization functionality in response to transmission or receipt of a SIP invite message.

In one implementation, the client application executing on the mobile station 49 provides the XY constraints to a stream synchronization module of a WLAN network interface driver. In one implementation, the XY constraints are statically defined and provided to the stream synchronization module at the time a stream setup call is executed. In other implementations, the client application can modulate the XY constraints based on the observed performance achieved by previous sets of XY constraints. For example, the client application may make the XY constraints tighter, after issuing a threshold number of throttle triggers in connection with previous sessions (see below).

To achieve an acceptable user-experience or other QoS measure, it is desirable to ensure that the wireless access point 50b that is handling the two streams does not make the two streams so far apart that they are unable to maintain the two preceding constraints. In one implementation, the present invention provides a mechanism by which a mobile station 49, at the time of adding or registering a stream with access point 50b can express the XY constraints relative to another media stream. In implementations involving extensions to the IEEE 802.11e standard, these XY constraints can be specified in an Information Element (IE) appended to the ADDTS request frame transmitted to the access point 50b, as described more fully below.

Figure 2:
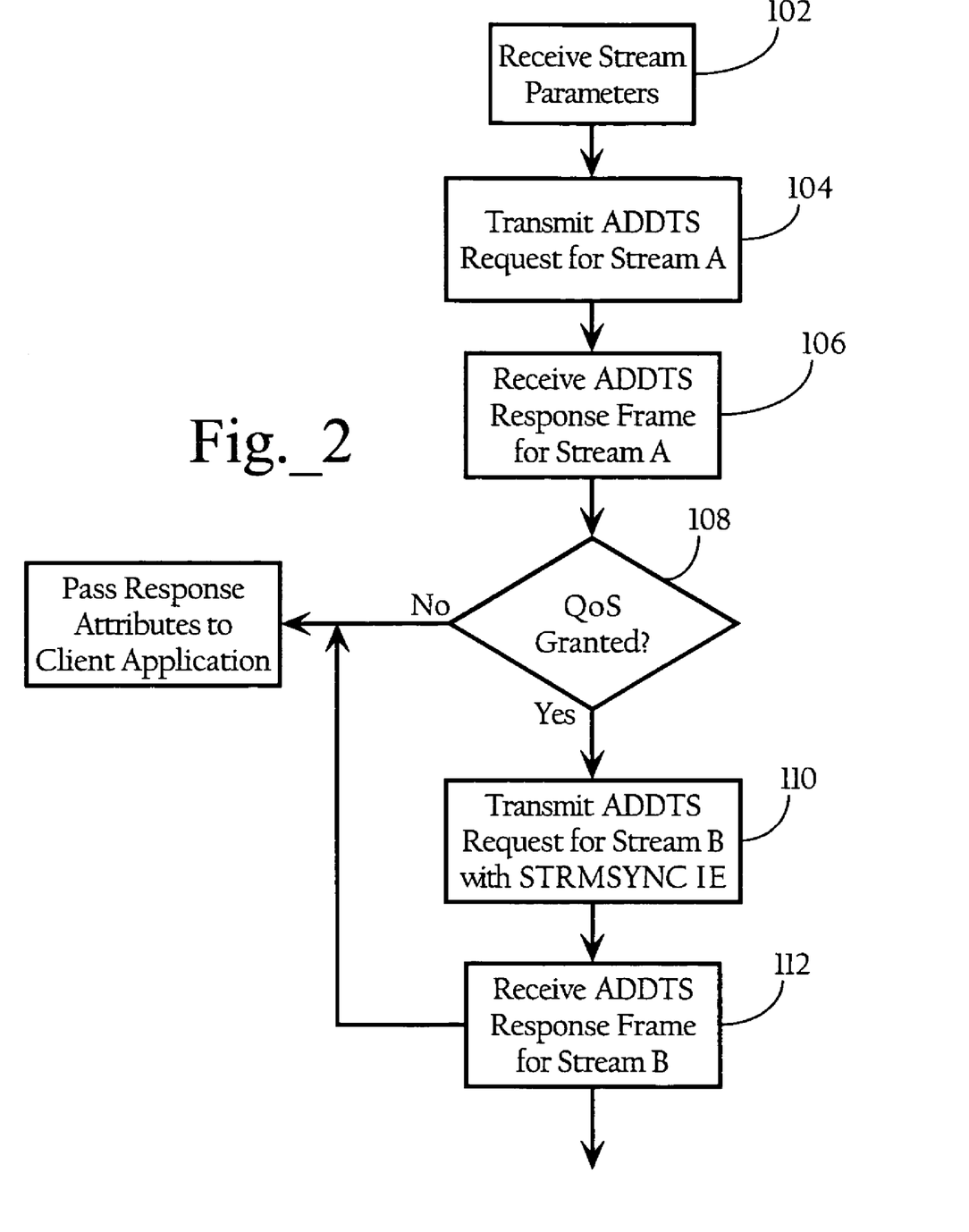
FIG. 2 is a flowchart illustrating steps of a method in accordance with one embodiment of the present invention.

FIG. 2 illustrates a process flow implemented by a stream synchronization module executing within the context of a mobile station 49. As a preliminary matter, a bit in the capability IE in beacon or other management frames could advertise if the access point indeed supports this "inter-stream synchronization" functionality of the present invention. As discussed above, a client application, following transmission or receipt of a SIP INVITE, may pass the stream synchronization module a set parameters identifying a plurality of streams associated with a given session. The set of parameters may include identifiers for the streams, QoS parameters for the streams individually, as well as synchronization parameters (see below). As FIG. 2 illustrates, when stream synchronization module receives the stream parameters (in one implementation, identifying stream A and B), it transmits an ADDTS request for stream A in a manner consistent with the IEEE 802.11e specification (104). According to the 802.11e specification, the ADDTS request is a management frame that-includes a TSpec information element (IE) that can be used to specify a requested set of QoS attributes, such as data rate, packet size, packetization interval, and priority. In one implementation, the stream for which QoS is requested is identified by a TSpec identifier (TSpecID) contained in the TSpec IE. After receipt of the ADDTS request from the mobile station 49, the wireless access point 50b processes the TSpec ID and determines whether to grant the requested QoS for the identified stream. According to the 802.11e specification, the wireless access point 50b transmits an ADDTS response frame that identifies the stream (using the TSpec ID), and the QoS parameters that it has granted, if any. As FIG. 2 illustrates, if the requested QoS is not granted (108), the stream synchronization module pass attributes of the ADDTS response frame to the client application, which can perform some action in response to the message, such as retrying the request. Otherwise, the stream synchronization module transmits a second ADDTS request for Stream B (110). In one implementation, in addition to a TSpec IE, the ADDTS request for Stream B also includes a STRMSYNC information element (IE) that identifies Stream A (by TSpecID), and a set of synchronization parameters (see below) (110). The access point 50b receives the second ADDTS request, processes the request and transmits an ADDTS response frame including a TSPEC IE and a STRMSYNC IE, which the mobile station 49 receives (112). The ADDTS Response will contain the same IE reflecting the values that the AP actually accepted and the clock basis it will use. Assuming the ADDTS request is granted, the access point 50b then enforces the QoS parameters it granted on the streams individually, as well as the XY constraints relative to the clock-basis it specified.

In one implementation, the synchronization parameters include 1) the XY constraints for Stream A and Stream B (see above), and 2) a preferred clock basis. For purposes of the stream synchronization functionality described herein, the clock-basis is defined as the time stamp on the basis of which the XY constraints are to be determined and enforced. In one implementation, the clock-basis are the RTP time stamps in the IP packets transmitted to the access point 50b. In another implementation, the clock basis is the arrival time of the IP packets at the access point 50b. The clock-basis could be the RTP time stamps on the IP packets coming into the access point 50b. In one implementation, although the mobile station identifies a-preferred clock basis, it is left to the access point to choose a clock basis. In one implementation, the choice of clock-basis may be a configurable parameter. In some implementations, the choice of clock-basis may be constrained by the streaming protocol that is used. Still further, the how the clock basis is selected is an implementation detail and is not critical to the present invention. Furthermore, the method by which the access point 50b tracks the clock-basis for each packet is similarly an implementation detail that does not limit the scope of the present invention.

The access point 50b can employ any suitable algorithm, method and/or process to enforce, at the link layer, the XY constraints negotiated by the mobile station 49. Still further, the 802.11e specification supports the mapping of transmitted frames to TSpecIDs to allow for enforcement of 802.11e QoS parameters, as well as the inter-stream synchronization parameters described herein. The exact method employed is not constrained by the present invention and is generally beyond the scope of this disclosure. For example, the access point 50b can employ the same, or a similar, algorithm as that employed by media gateway 30, or other media stream processing nodes, to enforce the XY constraints in order to synchronize the streams. The following articles, incorporated by reference herein, discuss inter-stream synchronization and algorithms: 1) Elliot, "Steam Synchronization for Voice over IP Conference Bridges," Dept. of Elec. & Comp. Engineering, McGill Univ., November 1994; 2) C. Liu. Y. Xie, M. J. Lee, and T. N. Saadawi, "Multipoint multimedia teleconference system with adaptive synchronization," *IEEE J. Selected Areas Communications,* vol. 14, pp. 1422-1435, September 1996; and 3) Y. Ishibashi and S. Tasaka, "A synchronization mechanism for continuous media in multimedia communications," in *Proc. of the Conf. on Computer Communications (IEEE-Infocom),*" Vol. 3, (Boston, USA), pp. 1010-1019, April 1995. In another implementation, the access point 50b can change the EDCA access parameters for either or both of the streams, on a per-frame basis, as necessary to enforce the negotiated XY constraints. For example, and in one implementation, 802.11e QoS is generally implemented by a differentiated or priority-based queuing mechanism comprising priority queues ranging from low priority to high priority queues. In one implementation, the access point 50a modulates the normal operation of the priority queuing mechanism to synchronize the streams.

As the foregoing provides, an implementation of the present invention provides a mechanism by which the mobile station 49 may express synchronization requirements for two or more traffic streams. This allows the mobile station 49 to negotiate meaningful QoS constraints without which the streaming service or other network application will be significantly degraded or rendered useless. One skilled in the art, however, will recognize that the actual XY constraints, which the mobile station 49 negotiates, are beyond the scope of this disclosure. Such constraints may depend upon the larger video conferencing (or other network streaming application) architecture, overall network design, application constraints, codec types, and the like.

Still further, one implementation of the present invention supports a so-called "throttling" mechanism that allows the mobile station 49 to signal the access point. 50b to adjust its XY enforcement parameters. For example, if a client application executing as a process in the mobile station determines that a certain stream is "lagging" behind another stream (potentially causing the application to behave erratically), the client application may invoke the stream synchronization module to send a throttle trigger to the access point 50b. In one implementation, the throttle trigger is sent in a QoS Control bit in a QoS-Data or QoS-Null packet, which identifies the lagging stream by TSpecID, transmitted to the access point 50b.

The access point 50b may respond to the throttle trigger in variety of manners. For example, the access point 50b may choose to ignore this trigger if it does not support this feature or can not do anything, given the loading conditions at the access point 50b. Alternatively, it may throttle the stream identified in the trigger QoS-Data/Null packet. In one implementation, this can be accomplished by changing queue access, 802.11e QoS, or other parameters associated with the stream. In another implementation, the access point 50b may adjust the XY constraints to change the operation of the stream synchronization mechanism as applied to the streams. Still further, in one implementation, the access point 50b may push out certain lower priority packets in a given queue sooner to allow packets corresponding to the lagging stream to catch up with the synchronized stream, whose packets may be buffered in a higher priority queue. In another implementation, the lagging packets may also be temporarily placed in a higher priority queue. In yet another implementation, the throttling may be accomplished by having the stream synchronization module on the mobile station 49 renegotiate either or both of the 802.11e QoS parameters for one or both streams, and/or the XY constraints by sending a new ADDTS request frame to the access point 50b.

The foregoing description of the embodiments of the invention has been presented for the purpose of illustration and description only. It is not intended to be exhaustive or to limit the invention to the specific forms disclosed. Many modifications and variations are possible in light of the above teaching. For example, in other implementations, the mobile station can be configured to include a STRMSYNC IE in the ADDTS requests for both streams with each STRMSYNC IE identifying the other stream. The access point can then match the ADDTS requests, evaluate the 802.11e QoS parameters and the synchronization parameters all at once in determining whether to grant the requested QoS and synchronization parameters. Therefore, it is intended that the scope of the invention be limited by the claims appended hereto, and not by the detailed description.

What is claimed is:

1. In a QoS-enabled wireless network comprising an access point including a link layer synchronization mechanism enabled to synchronize corresponding traffic streams, a method for synchronizing a first stream and a second stream, the method comprising:
    transmitting, to the access point, a first link-layer QoS request for the first stream; and
    transmitting, to the access point, a second link-layer QoS request for the second stream, wherein the second QoS request identifies the first stream and includes at least one synchronization parameter comprising a first threshold value indicating the maximum time a packet in the first stream is allowed to lag behind a corresponding packet in the second stream.

2. The method of claim 1 wherein the at least one synchronization parameter comprises a second threshold value indicating the maximum time a packet in the second stream is allowed to lag behind a corresponding packet in the first stream.

3. The method of claim 1 wherein the at least one synchronization parameter comprises a clock basis indicator.

4. The method of claim 3 wherein the clock basis indicator is one selected from a group consisting of a time stamp appended to packets in the stream, and the arrival time of the packets in the streams at the access point.

5. The method of claim 1 further comprising
    monitoring, at a mobile station, synchronization of the first and second streams; and
    conditionally transmitting, to the access point, a throttle trigger identifying either the first or the second stream, wherein the throttle trigger is operative to cause the access point to modulate operation of the link layer mechanism relative to the identified stream.

6. The method of claim 5 wherein the throttle trigger is transmitted if packets in the first stream lag behind corresponding packets in the second stream by a magnitude greater than a threshold value.

7. The method of claim 1 wherein the first link-layer QoS request comprises at least one QoS parameter.

8. The method of claim 1 wherein the second link-layer QoS request comprises at least one QoS parameter.

9. The method of claim 1 wherein the first link-layer QoS request identifies the identifies the second stream and includes at least one synchronization parameter.

10. In a QoS-enabled wireless network comprising an access point including a link layer synchronization mechanism enabled to synchronize corresponding traffic streams, an apparatus for synchronizing a first stream and a second stream, comprising
    a wireless network interface;
    a processor;
    a memory;
    a wireless network interface driver application, stored in the memory, comprising instructions operable to cause the processor and the wireless network interface to
    transmit, to the access point, a first link-layer QoS request for the first stream; and
    transmit, to the access point, a second link-layer QoS request for the second stream, wherein the second QoS request identifies the first stream and includes at least one synchronization parameter comprising a first threshold value indicating the maximum time a packet in the first stream is allowed to lag behind a corresponding packet in the second stream.

11. The apparatus of claim 10 wherein the at least one synchronization parameter comprises a second threshold value indicating the maximum time a packet in the second stream is allowed to lag behind a corresponding packet in the first stream.

12. The apparatus of claim 10 wherein the at least one synchronization parameter comprises a clock basis indicator.

13. The apparatus of claim 12 wherein the clock basis indicator is one selected from a group consisting of a time stamp appended to packets in the stream, and the arrival time of the packets in the streams at the access point.

14. The apparatus of claim 10 further comprising a client application, stored in the memory, comprising instructions operable to cause the processor to
    monitor synchronization of the first and second streams; and
    cause the wireless network interface driver application to transmit, to the access point, a throttle trigger identifying either the first or the second stream, wherein the throttle trigger is operative to cause the access point to modulate operation of the link layer mechanism relative to the identified stream.

15. In a QoS-enabled wireless network comprising an access point including a link layer synchronization mechanism enabled to synchronize corresponding traffic streams, an apparatus for synchronizing a first stream and a second stream, comprising
    means for wirelessly communicating with an access point associated with a QoS-enabled wireless network; for transmitting, to the access point, a first link-layer QoS request for the first stream; and for transmitting, to the access point, a second link-layer QoS request for the second stream, wherein the second QoS request identifies the first stream and includes at least one synchronization parameter comprising a first threshold value indicating the maximum time a packet in the first stream is allowed to lag behind a corresponding packet in the second stream.

16. An apparatus for synchronizing traffic streams over a wireless link, comprising
    a wireless network interface for communication with a mobile station;
    a processor;
    a memory; and
    an access point application comprising a link-layer QoS module and a link layer synchronization module, the access point application, physically stored in the memory, comprising instructions operable to cause the processor and the apparatus to
    receive a first link-layer QoS request identifying a first streams;
    receive a second link-layer QoS request identifying a second stream, and including synchronization parameters comprising an identifier corresponding to the first stream, and a synchronization constraint; and
    enforce the synchronization constraint on the first and second streams, wherein the synchronization constraint comprises a first threshold value indicating the maximum time a packet in the first stream is allowed to lag behind a corresponding packet in the second stream.

17. The apparatus of claim 16 wherein the synchronization constraint further comprises a second threshold value indicating the maximum time a packet in the second stream is allowed to lag behind a corresponding packet in the first stream.

18. The apparatus of claim 16 wherein the synchronization parameters include a clock basis indicator.

19. The apparatus of claim 18 wherein the clock basis indicator is one selected from a group consisting of a time stamp appended to packets in the stream, and the arrival time of the packets in the streams at the access point.

20. The apparatus of claim 16 wherein the access point application further comprises instructions operable to cause the processor and the apparatus to
   upon receipt of a throttle trigger identifying either the first or the second stream, modulate operation of the link layer QoS module relative to the identified stream.

21. In a QoS-enabled access point including a link layer synchronization mechanism enabled to synchronize corresponding traffic streams, a method for synchronizing a first stream and a second stream, the method comprising:
   receiving, from a mobile station, a first link-layer QoS request identifying a first stream
   receiving, from the mobile station, a second link-layer QoS request identifying a second stream, and including synchronization parameters comprising an identifier corresponding to the first stream, and a synchronization constraint; and
   enforcing the synchronization constraint on the first and second streams, wherein the synchronization constraint comprises a first threshold value indicating the maximum time a packet in the first stream is allowed to lag behind a corresponding packet in the second stream.

22. The method of claim 21 wherein the synchronization constraint further comprises a second threshold value indicating the maximum time a packet in the second stream is allowed to lag behind a corresponding packet in the first stream.

23. The method of claim 21 wherein the synchronization parameters include a clock basis indicator.

24. The method of claim 23 wherein the clock basis indicator is one selected from a group consisting of a time stamp appended to packets in the stream, and the arrival time of the packets in the streams at the access point.

25. The method of claim 21 further comprising
   upon receipt of a throttle trigger identifying either the first or the second stream, modulating operation of the link layer QoS mechanism relative to the identified stream.

26. In a QoS-enabled wireless network comprising an access point including a link layer synchronization mechanism enabled to synchronize corresponding traffic streams, a method for synchronizing a first stream and a second stream, the method comprising:
   transmitting, to the access point, a first link-layer QoS request for the first stream;
   transmitting, to the access point, a second link-layer QoS request for the second stream, wherein the second QoS request identifies the first stream and includes at least one synchronization parameter;
   monitoring, at a mobile station, synchronization of the first and second streams; and
   conditionally transmitting, to the access point, a throttle trigger identifying either the first or the second stream, wherein the throttle trigger is operative to cause the access point to modulate operation of the link layer mechanism relative to the identified stream.

27. The method of claim 26 wherein the at least one synchronization parameter comprises a first threshold value indicating the maximum time a packet in the first stream is allowed to lag behind a corresponding packet in the second stream, and a second threshold value indicating the maximum time a packet in the second stream is allowed to lag behind a corresponding packet in the first stream.

28. The method of claim 27 wherein the at least one synchronization parameter comprises a clock basis indicator.

29. The method of claim 28 wherein the clock basis indicator is one selected from a group consisting of a time stamp appended to packets in the stream, and the arrival time of the packets in the streams at the access point.

30. The method of claim 26 wherein the throttle trigger is transmitted if packets in the first stream lag behind corresponding packets in the second stream by a magnitude greater than a threshold value.

31. In a QoS-enabled wireless network comprising an access point including a link layer synchronization mechanism enabled to synchronize corresponding traffic streams, an apparatus for synchronizing a first stream and a second stream, comprising
   a wireless network interface;
   a processor;
   a memory;
   a wireless network interface driver application, stored in the memory, comprising instructions operable to cause the processor and the wireless network interface to
   transmit, to the access point, a first link-layer QoS request for the first stream;
   transmit, to the access point, a second link-layer QoS request for the second stream, wherein the second QoS request identifies the first stream and includes at least one synchronization parameter;
   monitor synchronization of the first and second streams; and
   cause the wireless network interface driver application to transmit, to the access point, a throttle trigger identifying either the first or the second stream, wherein the throttle trigger is operative to cause the access point to modulate operation of the link layer mechanism relative to the identified stream.

32. The apparatus of claim 31 wherein the at least one synchronization parameter comprises a first threshold value indicating the maximum time a packet in the first stream is allowed to lag behind a corresponding packet in the second stream, and a second threshold value indicating the maximum time a packet in the second stream is allowed to lag behind a corresponding packet in the first stream.

33. The apparatus of claim 32 wherein the at least one synchronization parameter comprises a clock basis indicator.

34. The apparatus of claim 33 wherein the clock basis indicator is one selected from a group consisting of a time stamp appended to packets in the stream, and the arrival time of the packets in the streams at the access point.

35. The apparatus of claim 31 wherein the throttle trigger is transmitted if packets in the first stream lag behind corresponding packets in the second stream by a magnitude greater than a threshold value.

36. An apparatus for synchronizing traffic streams over a wireless link, comprising
   a wireless network interface for communication with a mobile station;
   a processor;
   a memory; and
   an access point application comprising a link-layer QoS module and a link layer synchronization module, the access point application, physically stored in the memory, comprising instructions operable to cause the processor and the apparatus to receive a first link-layer QoS request identifying a first stream;

receive a second link-layer QoS request identifying a second stream, and including synchronization parameters comprising an identifier corresponding to the first stream, and a synchronization constraint;

enforce the synchronization constraint on the first and second streams; and upon receipt of a throttle trigger identifying either the first or the second stream, modulate operation of the link layer QoS module relative to the identified stream.

37. The apparatus of claim 36 wherein the synchronization constraint comprises a first threshold value indicating the maximum time a packet in the first stream is allowed to lag behind a corresponding packet in the second stream, and a second threshold value indicating the maximum time a packet in the second stream is allowed to lag behind a corresponding packet in the first stream.

38. The apparatus of claim 37 wherein the synchronization parameters include a clock basis indicator.

39. The apparatus of claim 38 wherein the clock basis indicator is one selected from a group consisting of a time stamp appended to packets in the stream, and the arrival time of the packets in the streams at the access point.

40. In a QoS-enabled access point including a link layer synchronization mechanism enabled to synchronize corresponding traffic streams, a method for synchronizing a first stream and a second stream, the method comprising:

receiving, from a mobile station, a first link-layer QoS request identifying a first stream receiving, from the mobile station, a second link-layer QoS request identifying a second stream, and including synchronization parameters comprising an identifier corresponding to the first stream, and a synchronization constraint;

enforcing the synchronization constraint on the first and second streams; and upon receipt of a throttle trigger identifying either the first or the second stream, modulating operation of the link layer QoS mechanism relative to the identified stream.

41. The method of claim 40 wherein the synchronization constraint comprises a first threshold value indicating the maximum time a packet in the first stream is allowed to lag behind a corresponding packet in the second stream, and a second threshold value indicating the maximum time a packet in the second stream is allowed to lag behind a corresponding packet in the first stream.

42. The method of claim 40 wherein the synchronization parameters include a clock basis indicator.

43. The method of claim 42 wherein the clock basis indicator is one selected from a group consisting of a time stamp appended to packets in the stream, and the arrival time of the packets in the streams at the access point.

* * * * *